United States Patent
Yokouchi et al.

(10) Patent No.: US 10,300,780 B2
(45) Date of Patent: May 28, 2019

(54) SUPPORT STRUCTURE FOR ROTATING SHAFTS OF VEHICLE

(71) Applicant: TOYOTA JIDOSHA KABUSHIKI KAISHA, Toyota-shi, Aichi (JP)

(72) Inventors: Yoshimitsu Yokouchi, Okazaki (JP); Hiroki Kuwamoto, Toyota (JP); Haruo Isomura, Toyota (JP); Akitaka Ichikawa, Nisshin (JP); Hiroatsu Endo, Nagoya (JP)

(73) Assignee: TOYOTA JIDOSHA KABUSHIKI KAISHA, Aichi-ken, Tokyo (JP)

( * ) Notice: Subject to any disclaimer, the term of this patent is extended or adjusted under 35 U.S.C. 154(b) by 0 days.

(21) Appl. No.: 15/542,130

(22) PCT Filed: Dec. 24, 2015

(86) PCT No.: PCT/JP2015/086117
§ 371 (c)(1),
(2) Date: Jul. 7, 2017

(87) PCT Pub. No.: WO2016/111186
PCT Pub. Date: Jul. 14, 2016

(65) Prior Publication Data
US 2018/0257476 A1 Sep. 13, 2018

(30) Foreign Application Priority Data

Jan. 7, 2015 (JP) ................................. 2015-001896

(51) Int. Cl.
*B60K 6/40* (2007.10)
*B60K 6/445* (2007.10)
(Continued)

(52) U.S. Cl.
CPC ................ *B60K 6/40* (2013.01); *B60K 6/445* (2013.01); *F16D 1/04* (2013.01); *F16D 3/12* (2013.01);
(Continued)

(58) Field of Classification Search
CPC . B60K 6/40; B60K 6/445; B60K 6/36; B60K 1/00; F16D 1/04; F16D 3/12;
(Continued)

(56) References Cited

U.S. PATENT DOCUMENTS 8,464,776 B2 * 6/2013 Anthoine .................. F16D 3/68
160/310
8,505,675 B2 * 8/2013 Suzuki ................. B62D 5/0409
180/444
(Continued)

FOREIGN PATENT DOCUMENTS

JP 2011-214646 A 10/2011
WO 2011/074042 A1 6/2011

*Primary Examiner* — James A Shriver, II
*Assistant Examiner* — Brian L Cassidy
(74) *Attorney, Agent, or Firm* — Sughrue Mion, PLLC (57) ABSTRACT

A support structure for rotating shafts of a vehicle, including: a drive shaft operatively connected to a power transmitting shaft to which a drive force of an engine is transmitted; and a rotor shaft of an electric motor spline-coupled to the drive shaft, each of the rotor shaft of the electric motor and the drive shaft is being supported by at least one bearing, in the support structure, one of the rotor shaft and the drive shaft is constituted by a first rotary shaft and a second rotary shaft which are operatively connected to each other, and an elastic member is interposed between the first rotary shaft and the second rotary shaft such that the first and second rotary shafts are operatively spline-connected to each other through the elastic member.

7 Claims, 8 Drawing Sheets

(51) Int. Cl.
    *F16D 3/76*     (2006.01)
    *F16F 15/126*     (2006.01)
    *F16F 15/136*     (2006.01)
    *F16D 1/04*     (2006.01)
    *F16D 3/12*     (2006.01)
    *F16D 3/64*     (2006.01)
    *B60K 6/36*     (2007.10)

(52) U.S. Cl.
    CPC ............... *F16D 3/64* (2013.01); *F16D 3/76* (2013.01); *F16F 15/126* (2013.01); *F16F 15/136* (2013.01); *B60K 6/36* (2013.01); *Y02T 10/6239* (2013.01)

(58) Field of Classification Search
    CPC ...... F16D 3/64; F16D 3/76; F16D 3/08; F16F 15/126; F16F 15/136
    USPC ....................................................... 180/65.25
    See application file for complete search history.

(56) References Cited

U.S. PATENT DOCUMENTS

| | | | | |
|---|---|---|---|---|
| 9,533,561 | B2* | 1/2017 | Murata | B60K 6/36 |
| 9,718,493 | B2* | 8/2017 | Moriyama | F16D 3/68 |
| 9,789,903 | B2* | 10/2017 | Moriyama | B62D 7/224 |
| 9,796,418 | B2* | 10/2017 | Moriyama | B62D 7/224 |
| 9,863,482 | B2* | 1/2018 | Yamaguchi | B62D 5/04 |
| 2003/0186749 | A1* | 10/2003 | Hauck | F16D 3/68 464/75 |
| 2005/0072620 | A1* | 4/2005 | Joushita | B62D 5/0409 180/444 |
| 2006/0205293 | A1* | 9/2006 | Fuse | B63H 23/34 440/83 |
| 2008/0009354 | A1* | 1/2008 | Hodjat | F16D 3/68 464/87 |
| 2008/0035414 | A1* | 2/2008 | Kubota | F16D 3/68 180/444 |
| 2008/0128195 | A1* | 6/2008 | Kubota | F16D 3/68 180/444 |
| 2009/0093335 | A1* | 4/2009 | Yokouchi | B60W 10/02 475/323 |
| 2011/0319212 | A1* | 12/2011 | Kato | F16H 57/0006 475/5 |
| 2012/0208649 | A1* | 8/2012 | Nakagawa | F16D 3/68 464/73 |
| 2012/0255396 | A1* | 10/2012 | Murata | B60K 6/36 74/661 |
| 2012/0264524 | A1* | 10/2012 | Nakagawa | B62D 5/0409 464/73 |
| 2014/0161509 | A1* | 6/2014 | Choi | F16D 1/10 403/2 |
| 2014/0335998 | A1* | 11/2014 | Ichikawa | F16H 57/0006 477/5 |
| 2015/0020639 | A1* | 1/2015 | Kornmayer | F16D 3/76 74/493 |
| 2015/0024902 | A1* | 1/2015 | Hori | B60K 6/445 477/3 |
| 2015/0082929 | A1* | 3/2015 | Isomura | B60K 1/00 74/331 |
| 2015/0275946 | A1* | 10/2015 | Ishizaki | B62D 1/20 403/359.1 |
| 2016/0238083 | A1* | 8/2016 | Piorkowski | F16D 3/12 |
| 2016/0311305 | A1* | 10/2016 | Ichikawa | B60K 6/365 |
| 2017/0067512 | A1* | 3/2017 | Nakawatari | F16D 1/02 |
| 2017/0114837 | A1* | 4/2017 | Yamaguchi | B62D 5/04 |
| 2017/0174250 | A1* | 6/2017 | Segawa | B62D 5/04 |

\* cited by examiner

SUPPORT STRUCTURE FOR ROTATING SHAFTS OF VEHICLE

CROSS REFERENCE TO RELATED APPLICATIONS

This application is a National Stage of International Application No. PCT/JP2015/086117 filed Dec. 24, 2015, claiming priority based on Japanese Patent Application No. 2015-001896 filed Jan. 7, 2015, the contents of all of which are incorporated herein by reference in their entirety.

TECHNICAL FIELD

The present invention relates to a support structure for a rotor shaft of an electric motor provided in a hybrid vehicle, and a drive shaft spline-coupled to the rotor shaft, and more particularly to a mechanism for damping a tooth butting noise generated in a spline-coupling portion between the rotor shaft and the drive shaft.

BACKGROUND ART

A hybrid vehicle having an engine and an electric motor as a drive power source device is arranged such that a rotor shaft of the electric motor is spline-coupled to a suitable drive shaft. Patent Document 1 discloses an example of this arrangement wherein a drive shaft 18 is spline-coupled to a rotor shaft 17 of a motor 12 (electric motor). This Patent Document 1 also discloses an arrangement wherein an engine is operatively connected to a counter shaft 20 radially spaced from a rotary axis of the engine, and the motor 12 is operatively connected to the counter shaft 20 radially spaced from the axis of the motor 12, through the rotor shaft 17 and the drive shaft 18. It is noted that the counter shaft 20 is operatively connected to drive wheels through a differential gear device 21.

In the hybrid vehicle arranged as described above, the rotor shaft 17 is in a free state while a torque variation of the engine is transmitted to the drive shaft 18 through the counter shaft 20, particularly when a drive torque Nm of the motor 12 is close to zero. In this free state of the rotor shaft 17, a tooth butting noise is generated due to mutual butting of spline teeth of the rotor shaft 17 and spline teeth of the drive shaft 18 against each other. To overcome this problem, Patent Document 1 proposes to provide an elastic member 70 in the form of an O-ring in a spline-coupling portion between the rotor shaft 17 and the drive shaft 18, for reducing a butting force of the spline teeth, for thereby reducing the tooth butting noise.

PRIOR ART DOCUMENT

Patent Document

Patent Document 1: JP-2011-214646 A1

SUMMARY OF THE INVENTION

Object Achieved by the Invention

By the way, each of the rotor shaft 17 and the drive shaft 18 in the arrangement of Patent Document 1 is rotatably supported by bearings. Accordingly, when the rotor shaft 17 and the drive shaft 18 are installed in place, one of the rotor shaft 17 and the drive shaft 18 is installed while the other rotating shaft previously installed is supported by the bearings. Therefore, the elastic member installed between the rotor shaft 17 and the drive shaft 18 provides a force of resistance to an axial inserting movement of the above-indicated other rotating shaft into the above-indicated one rotating shaft. This force of resistance causes an increase of a load (installation load) required to assemble the two rotating shafts together, giving rise to a risk of application of an excessive load to the bearings supporting the above-indicated one rotating shaft. Accordingly, the function of the elastic member is limited due to limitation of the installation load upon assembling of the two rotating shafts, so that the butting force of the spline teeth cannot be reduced as needed.

The present invention was made in view of the background art described above. It is therefore an object of the present invention to provide a support structure for the rotor shaft of the electric motor and the drive shaft, more particularly a mechanism which permits effectively damping of the tooth butting noise generated in the spline-coupling portion between the rotor shaft and the drive shaft.

Means for Achieving the Object

The object indicated above is achieved according to a first aspect of the present invention, which provides a support structure for rotating shafts of a vehicle, (a) comprising a drive shaft operatively connected to a power transmitting shaft to which a drive force of an engine is transmitted, and a rotor shaft of an electric motor spline-coupled to the above-described drive shaft, each of the above-described rotor shaft of the electric motor and the above-described drive shaft is supported by at least one bearing, characterized in that: (b) one of the above-described rotor shaft and the above-described drive shaft is constituted by a first rotary shaft and a second rotary shaft which are operatively spline-connected to each other; and (c) an elastic member is interposed between the above-described first rotary shaft and the above-described second rotary shaft such that the first and second rotary shafts are operatively connected to each other through the elastic member.

According to a second aspect of the invention, the support structure according to the first aspect of the invention is characterized in that the above-described drive shaft is constituted by the above-described first rotary shaft and the above-described second rotary shaft, and the above-described first rotary shaft is spline-coupled to said rotor shaft while the above-described second rotary shaft is operatively connected to the above-described power transmitting shaft.

According to a third aspect of the invention, the support structure according to the first aspect of the invention is characterized in that the above-described rotor shaft is constituted by the above-described first rotary shaft and the above-described second rotary shaft, and the above-described second rotary shaft is spline-coupled to the above-described drive shaft.

According to a fourth aspect of the invention, the support structure according to any one of the first through third aspects of the invention is characterized in that the above-described first rotary shaft and the above-described second rotary shaft have respective axial portions in which these rotary shafts are spline-coupled to each other, and respective other axial portions overlapping each other as seen in their radial direction after assembling of the first and second rotary shafts with respect to each other, and the above-described elastic member is disposed in a radial gap formed in the above-described other axial portions of the first and second rotary shafts overlapping each other.

According to a fifth aspect of the invention, the support structure according to any one of the first through third aspects of the invention is characterized in that the above-described elastic member is an elongate member which is disposed within the above-described first rotary shaft having an axial bore and the above-described second rotary shaft having an axial bore, and the above-described elongate member is connected at its one axial end to the above-described first rotary shaft, and at its other axial end to the above-described second rotary shaft.

According to a sixth aspect of the invention, the support structure according to the fifth aspect of the invention is characterized in that the above-described drive shaft and the above-described power transmitting shaft are operatively connected to each other through a helical gear, and a second elastic member is interposed at at least one of the following positions: between the above-described first rotary shaft and a member adjacent to the above-described first rotary shaft in the axial direction of the first rotary shaft; between the above-described second rotary shaft and a member adjacent to the above described second rotary shaft in the axial direction of the second rotary shaft; and between a member to be moved together with said first rotary shaft or said second rotary shaft, and a member axially adjacent to this member.

According to a seventh aspect of the invention, the support structure according to the fifth or sixth aspect of the invention is characterized in that a rotational position of the above-described elongate member is determined such that spline teeth of the above-described first rotary shaft and spline teeth of the above-described second rotary shaft are not in contact with each other when a torque is not transmitted to the above-described elongate member.

Advantages of the Invention

As described above, one of the rotor shaft and the drive shaft is constituted by the first rotary shaft and the second rotary shaft, and the elastic member is interposed between the first and second rotary shafts such that the first and second rotary shafts are operatively connected to each other through the elastic member, so that the tooth butting noise due to a torque variation transmitted from the engine can be reduced by the elastic member. Further, the rotor shaft of the electric motor and the drive shaft are assembled with respect to each other after the rotor shaft or the drive shaft is assembled in advance such that the elastic member is interposed between the first rotary shaft and the second rotary shaft. Namely, the elastic member is installed upon assembling of the first rotary shaft and the second rotary shaft in advance, so the load required for installation of one of the rotor shaft and the drive shaft while the other of the rotor shaft and the drive shaft is supported by a ball bearing or bearings is not increased in the presence of the elastic member, making it possible to prevent application of an excessive load to the ball bearing or bearings upon installation of the above-indicated one of the rotor shaft and the drive shaft. In addition, it is not necessary to limit the performance of the elastic member since the elastic member is installed upon assembling of the first rotary shaft and the second rotary shaft with respect to each other, so that the function of the elastic member to reduce the tooth butting noise can be greatly improved.

In the support structure according to the second aspect of the invention, the rotor shaft and the drive shaft can be assembled with respect to each other, after assembling of the drive shaft such that the elastic member is interposed between the first and second rotary shafts. Accordingly, it is possible to prevent application of an excessive load to the ball bearing or bearings upon assembling of the rotor shaft and the drive shaft with respect to each other. In addition, the tooth butting noise due to the torque variation transmitted from the engine can be reduced by the elastic member provided in the drive shaft.

In the support structure according to the third aspect of the invention, the rotor shaft and the drive shaft can be assembled with respect to each other, after assembling of the rotor shaft such that the elastic member is interposed between the first and second rotary shafts. Accordingly, it is possible to prevent application of an excessive load to the ball bearing or bearings upon assembling of the rotor shaft and the drive shaft with respect to each other. In addition, the tooth butting noise due to the torque variation transmitted from the engine can be reduced by the elastic member provided in the rotor shaft.

In the support structure according to the fourth aspect of the invention, the elastic member is disposed in the radial gap formed between the axial portions of the first rotary shaft and the second rotary shaft which overlap each other, so that the tooth butting force to be generated upon mutual butting of spline teeth of the first rotary shaft and spline teeth of the second rotary shaft against each other is reduced by the elastic member, whereby the tooth butting noise is reduced. Further, since the elastic member is to be interposed between the first rotary shaft and the second rotary shaft, the first rotary shaft, the second rotary shaft, and the elastic member are assembled in advance with respect to each other, so that it is possible to prevent application of an excessive load to the ball bearing or bearings upon assembling of the rotor shaft and the drive shaft with respect to each other.

In the support structure according to the fifth aspect of the invention, the first rotary shaft and the second rotary shaft are connected to each other through the elongate member, so that the elongate member is torsionally twisted upon mutual butting of spline teeth of the first rotary shaft and spline teeth of the second rotary shaft against each other, whereby the force of the mutual butting of the spline teeth of the first and second rotary shafts against each other is reduced, and the tooth butting noise is reduced. Further, the elongate member is installed upon assembling of the first and second rotary shafts with respect to each other, so that it is possible to prevent application of an excessive load to the ball bearing or bearings upon assembling of the rotor shaft and the drive shaft with respect to each other.

In the support structure according to the sixth aspect of the invention, the drive shaft and the power transmitting shaft are operatively connected to each other through the helical gear, so that the first rotary shaft and the second rotary shaft are moved in the thrust direction (in the axial direction) due to a force acting on the drive shaft and the rotor shaft in the thrust direction when a drive force is transmitted between the drive shaft and the power transmitting shaft. However, the second elastic member permits damping of a shock of an abutting contact between the members axially adjacent to each other upon movements in the thrust direction of the first rotary shaft, the second rotary shaft, and the member to be moved together with the first or second rotary shaft.

In the support structure according to the seventh aspect of the invention, the elongate member is torsionally twisted prior to the mutual butting of the external spline teeth of the first rotary shaft and the internal spline teeth of the second rotary shaft against each other, when a torque is transmitted to the drive shaft, whereby the butting force is reduced, and the butting noise is reduced.

MODE FOR CARRYING OUT THE INVENTION

Referring to the drawings, embodiments of the present invention will be described in detail. It is to be understood that the drawings showing the following embodiments are simplified and transformed as needed, and do not necessarily accurately represent the dimensions and shapes of various part of the embodiments.

First Embodiment

Figure 1:
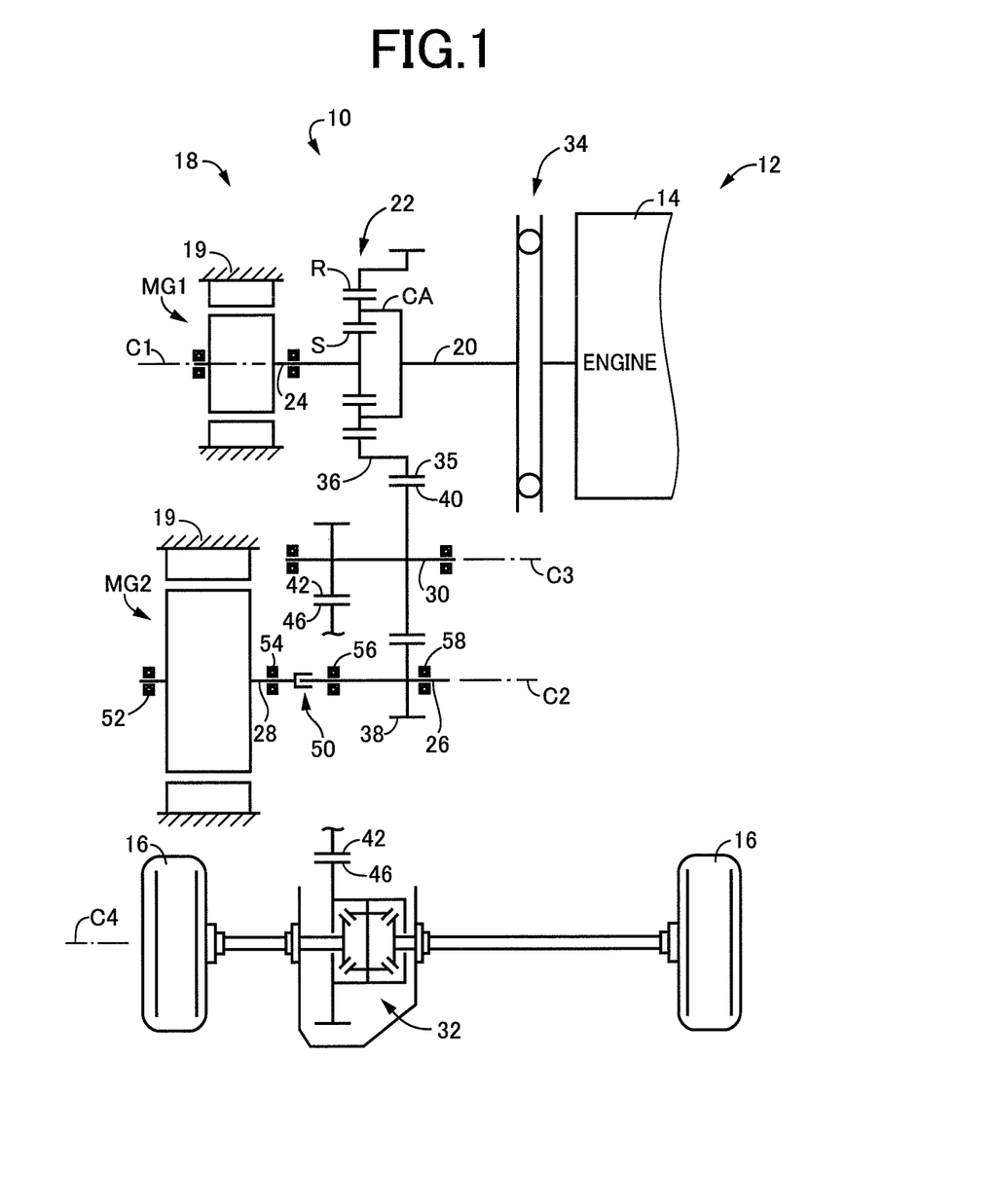
FIG. 1 is a schematic view for explaining a structure of a drive system provided in a hybrid vehicle, to which the present invention is applicable.

FIG. 1 is the schematic view for explaining a structure of a drive system 12 provided in a hybrid vehicle 10 (vehicle), to which the present invention is applicable. The drive system 12 includes an engine 14 such as a known gasoline engine or diesel engine functioning as a vehicle drive power source (drive power source), and a vehicular power transmitting system 18 (hereinafter referred to as "power transmitting system 18) through which a drive force of the engine 14 is transmitted to drive wheels 16. The power transmitting system 18 has four rotary axes (C1-C4) parallel to each other, which are disposed within a stationary member in the form of a casing 19. The first axis C1 is coaxial with an axis of rotation of the engine 14, and an output shaft 20, a power distributing mechanism 22, and a first rotor shaft 24 of a first electric motor MG1 are rotatably supported on the first axis C1. A speed reduction shaft 26 and a second rotor shaft 28 of a second electric motor MG2 are rotatably supported on the second axis C2. A counter shaft 30 is rotatably supported on the third axis C3. A differential gear device in the form of a differential gear 32 is rotatably supported on the fourth axis C4. It is noted according to the present invention that the speed reduction shaft 26 corresponds to a drive shaft, and the second rotor shaft 28 corresponds to a rotor shaft of an electric motor, while the counter shaft 30 corresponds to a power transmitting shaft.

The output shaft 20 coaxial with the first axis C1 is connected to the engine 14 through a damping device 34, and the power distributing mechanism 22 is interposed between the output shaft 20 and the first electric motor MG1. The power distributing mechanism 22 is principally constituted by a sun gear S and a ring gear R rotatable about the first axis C1, and a carrier CA supporting a pinion gear which is held in meshing engagement with the sun gear S and the ring gear R and which supports the pinion gear such that the pinion gear is rotatable about its axis and the axis of the first axis C1. The sun gear S is connected to the first rotor shaft 24 of the first electric motor MG1 such that the sun gear S is rotated with the first rotor shaft 24, and the carrier CA is connected to the engine 14 through the output shaft 20 and the damping device 34, while the ring gear R is formed integrally with and radially inwardly of a composite gear shaft 36 having a counter drive gear 35. Accordingly, a rotary motion of the ring gear R is transmitted to the counter drive gear 35.

The second rotor shaft 28 of the second electric motor MG2 coaxial with the second axis C2 is connected to the speed reduction shaft 26 through a spline-coupling portion 50. The speed reduction shaft 26 has a speed reduction gear 38 of a helical type, which is held in meshing engagement with a counter driven gear 40 formed on the counter shaft 30, so that the speed reduction shaft 26 and the counter shaft 30 are operatively connected to each other through a gear pair (helical gears) consisting of the speed reduction gear 38 and the counter driven gear 40. The second rotor shaft 28 of the second electric motor MG2 is rotatably supported at its opposite axial ends by a ball bearing 52 and a ball bearing 54, while the speed reduction shaft 26 is rotatably supported at its opposite axial ends by a ball bearing 56 and a ball bearing 58. It is noted that the second rotor shaft 28 of the second electric motor MG2, the speed reduction shaft 26, the ball bearings 52, 54, 56, 58, etc. constitute a support structure for rotating shafts, which is provided according to the principle of the present invention.

The counter shaft 30 coaxial with the third axis C3 has integrally formed counter driven gear 40 and differential drive gear 42. The counter driven gear 40 is held in meshing engagement with the counter drive gear 35 and the speed reduction gear 38, while the differential drive gear 42 is held in meshing engagement with a differential ring gear 46 formed on the differential gear 32. Thus, the counter shaft 30 is operatively connected to the engine 14 and the second electric motor MG2 through the counter driven gear 40 meshing with the counter drive gear 35 and the speed reduction gear 38.

The differential gear 32 coaxial with the fourth axis C4 includes the differential ring gear 46 held in meshing engagement with the differential drive gear 42, and is provided with a differential mechanism for giving the pair of left and right drive wheels 16 a required difference between their rotating speeds. Therefore, the counter shaft 30 is operatively connected to the drive wheels 16 through the differential gear 32, etc.

The second rotor shaft 28 and the speed reduction shaft 26 are spline-coupled and thus operatively connected to each other. In this respect, it is noted that the second rotor shaft 28 is in a free state while a torque variation of the engine 14 is transmitted to the speed reduction shaft 26 through the counter shaft 30, etc. when a drive torque Nm of the second electric motor MG2 is zero. In this free state of the second rotor shaft 28, a tooth butting noise is generated in the spline-coupling portion 50 between the second rotor shaft 28 and the speed reduction shaft 26, due to mutual butting of spline teeth of the second rotor shaft 28 and spline teeth of the speed reduction shaft 26 against each other.

In view of the problem indicated above, the present embodiment of the invention is configured such that the speed reduction shaft 26 is constituted by a first rotary shaft 60 and a second rotary shaft 62 described below, and an elastic member 74 is interposed between the first rotary shaft 60 and the second rotary shaft 62 such that these rotary shafts 60, 62 are operatively (i.e., in a power transmittable manner) connected to each other through the elastic member 74, so as to reduce the tooth butting noise. A structure for reducing the tooth butting noise will be described below.

Figure 2:
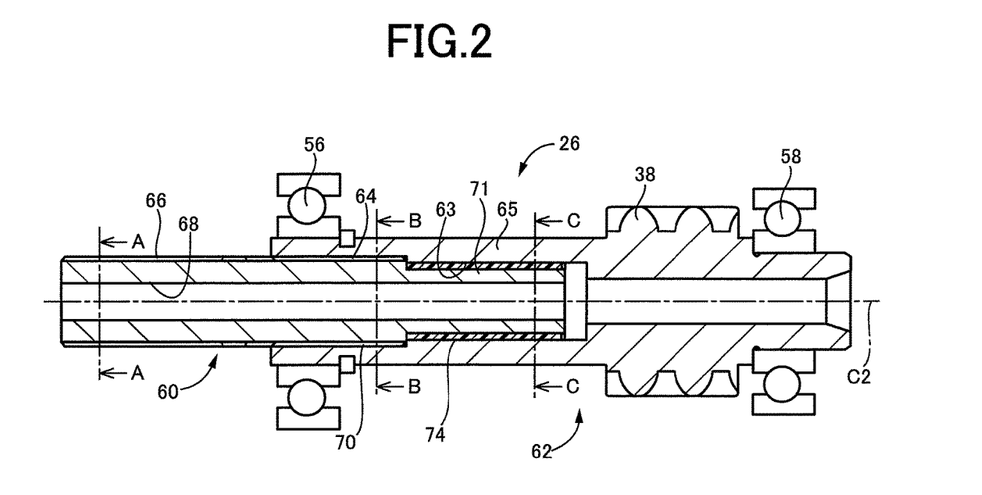
FIG. 2 is a cross sectional view showing a structure of a speed reduction shaft of FIG. 1.
Figure 3:
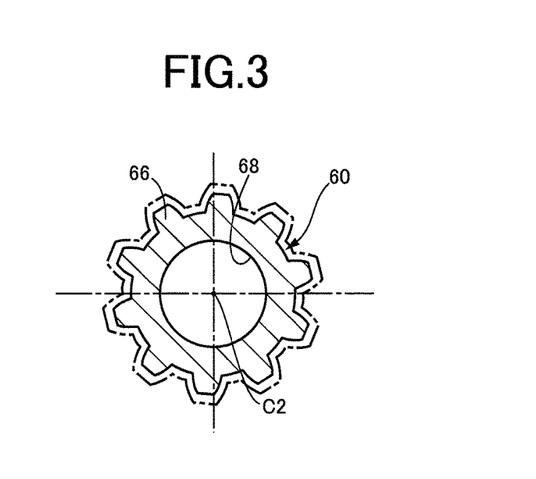
FIG. 3 is a cross sectional view taken along line A-A of FIG. 2.
Figure 4:
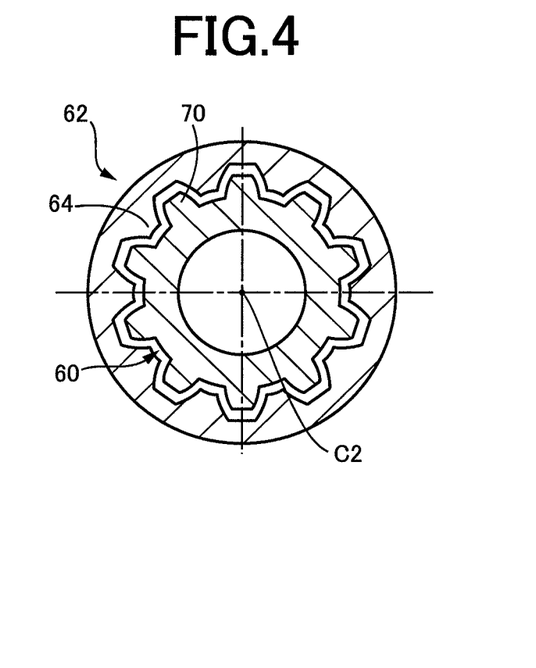
FIG. 4 is a cross sectional view taken along line B-B of FIG. 2.
Figure 5:
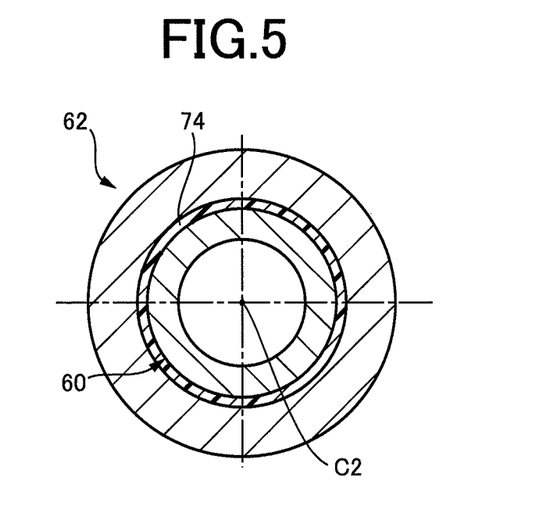
FIG. 5 is a cross sectional view taken along line C-C of FIG. 2.

FIG. 2 is the view showing the structure of the speed reduction shaft 26 disposed on the second axis C2. FIG. 2 is the cross sectional view showing the overall arrangement of the speed reduction shaft 26, FIG. 3 is the cross sectional view taken along line A-A of FIG. 2, FIG. 4 is the cross sectional view taken along line B-B of FIG. 2, and FIG. 5 is the cross sectional view taken along line C-C of FIG. 2.

As shown in FIG. 2, the speed reduction shaft 26 is supported rotatably about the second axis C2, by the ball bearings 56 and 58. The speed reduction shaft 26 is constituted by the first rotary shaft 60 spline-coupled to the second rotor shaft 28 of the second electric motor MG2, and the second rotary shaft 62 which has the speed reduction gear 38 held in meshing engagement with the counter driven gear 40 and which is operatively connected to the counter shaft 30.

The second rotary shaft 62 has an insert bore 63 formed in an axial portion on the side of the ball bearing 56 (on the side of the second electric motor MG2, namely, on its left side as seen in FIG. 2). One axial end portion of the first rotary shaft 60 is inserted in this insert bore 63.

The first rotary shaft 60 is disposed rotatably about the second axis C2 such that the above-indicated one axial end portion is inserted in the second rotary shaft 62, and has a center bore 68 coaxial with the second axis C2. As shown in FIG. 3, the first rotary shaft 60 has external spline teeth 66 formed on an outer circumferential surface of its axial end portion remote from the ball bearing 58 (i.e. the second electric motor MG2), so that the first rotary shaft 60 is spline-coupled to the second rotor shaft 28 of the second electric motor MG2 through the external spline teeth 66. As shown in FIG. 4, the first rotary shaft 60 has external spline teeth 70 formed on an outer circumferential surface of a part of its axial portion located radially inwardly of the second rotary shaft 62, so that the first rotary shaft 60 is spline-coupled to the second rotary shaft 62 through the external spline teeth 70. The external spline teeth 66 and the external spline teeth 70 have the same diameter and are axially spaced apart from each other. It is noted that the external spline teeth 66 and the external spline teeth 70 may have the same number of teeth and/or the same shape, or different numbers of teeth and/or different shapes.

The first rotary shaft 60 has an axial extension 71 extending axially from its axial portion of the external spline teeth 70 toward the ball bearing 58 (in the right direction as seen in FIG. 2). The external spline teeth 70 and the axial extension 71 are disposed radially inwardly of the second rotary shaft 62. The axial extension 71 has an outside diameter which is smaller than the diameter (addendum circle diameter) of the axial portion of the first rotary shaft 60 on which the external spline teeth 70 are formed.

The second rotary shaft 62 is rotatably supported at its opposite axial end portions by the ball bearings 56 and 58, and has the speed reduction gear 38 of the helical type in its axial portion on the side of the ball bearing 58. The second rotary shaft 62 has a cylindrical portion 65, in the presence of the insert bore 63 formed in the axial portion of the second rotary shaft 62 on the side of the ball bearing 56. The cylindrical portion 65 has internal spline teeth 64 in the inner circumferential surface of its axial portion on the side of the ball bearing 56, and the internal spline teeth 64 are spline-coupled to the external spline teeth 70. The insert bore 63 has a shoulder portion between an axial part in which the elastic member 74 is disposed, and an axial part in which the internal spline teeth 64 are formed. The former axial part has an inside diameter (radial dimension) which is smaller than an inside diameter of the latter axial part (dedendum circle diameter of the internal spline teeth 64).

When the first rotary shaft 60 is fitted in the second rotary shaft 62, the external spline teeth 70 of the first rotary shaft 60 are spline-coupled to the internal spline teeth 64 of the second rotary shaft 62, so that the first rotary shaft 60 and the second rotary shaft 62 are operatively connected to each other.

It is also noted that the axial extension 71 of the first rotary shaft 60 and the cylindrical portion 65 of the second rotary shaft 62 overlap each other as seen in their radial direction such that a radial gap is formed between the outer circumferential surface of the axial extension 71 of the first rotary shaft 60 and the inner circumferential surface of the cylindrical portion 65 of the second rotary shaft 62. Within this radial gap, the elastic member 74 formed of a rubber or resin material is disposed as shown in FIG. 5. The elastic member 74 has a tubular shape in accordance of the form of the radial gap. It is further noted that the elastic member 74 is dimensioned so that the elastic member 74 is radially pressed (compressed) with a suitable force by the first rotary shaft 60 and the second rotary shaft 62 when the elastic member 74 is interposed between the first rotary shaft 60 and the second rotary shaft 62. It is noted according to the present invention that the axial extension 71 and the cylindrical portion 65 correspond to respective axial portions of the first and second rotary shafts which overlap each other as seen in the radial direction.

The function of the elastic member 74 provided as described above will be explained. When a torque variation of the engine 14 is transmitted to the speed reduction shaft 26 while the drive torque Nm of the second electric motor MG2 is zero, the elastic member 74 interposed between the first rotary shaft 60 and the second rotary shaft 62 is elastically deformed, so that an energy generated upon mutual butting of the external spline teeth 70 of the first rotary shaft 60 and the internal spline teeth 64 of the second rotary shaft 62 against each other is absorbed by the elastic member 74, whereby a force of mutual butting of the external spline teeth 70 and the internal spline teeth 64 is reduced. Accordingly, a tooth butting noise due to the mutual butting of the external spline teeth 70 and the internal spline teeth 64 is reduced.

Figure 6:
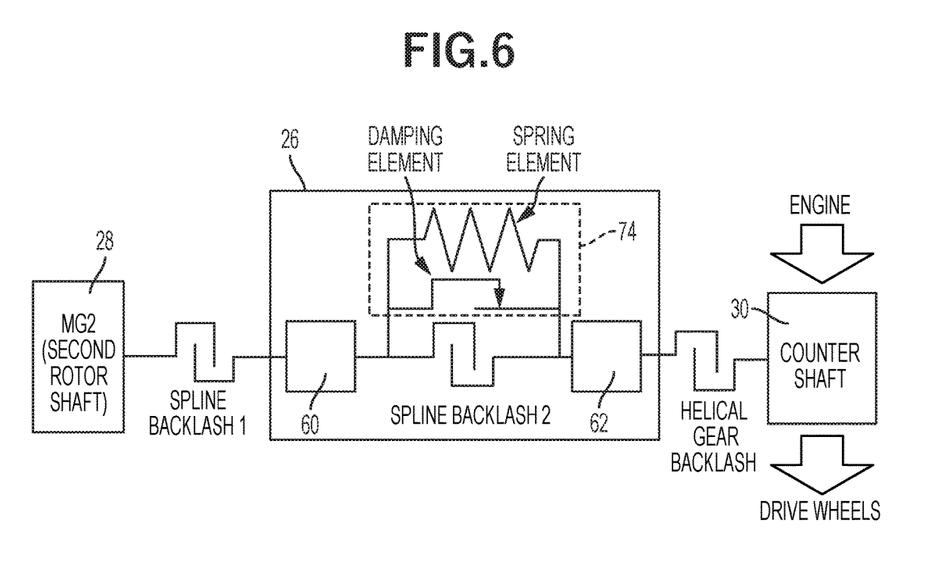
FIG. 6 is a model view of a part between a second electric motor and a counter shaft, which is shown in FIG. 1.

FIG. 6 shows a model of arrangement of a part between the second electric motor MG2 and the counter shaft 30. As shown in FIG. 6, the speed reduction shaft 26 is constituted by the first rotary shaft 60 and the second rotary shaft 62. Between these first and second rotary shafts 60, 62, there exists a spline backlash 2 left between the internal and external spline teeth 64, 70, and the elastic member 74, such that the spline backlash 2 and the elastic member 74 are parallel with each other. Since the elastic member 74 is provided with a spring element (rigidity) and a damping element for reducing the tooth butting force, a portion of the tooth butting force generated due to the spline backlash 2 is absorbed by the elastic member 74, so that the tooth butting noise is reduced. Thus, the tooth butting noise due to the torque variation transmitted from the engine 14 is reduced by the elastic member 74 disposed within the speed reduction shaft 26. As a result, the torque variation transmitted from the engine 14 is absorbed by the elastic member 74, and the torque variation to be transmitted to the spline-coupling portion 50 between the rotor shaft 28 and the speed reduction shaft 26 is reduced, whereby the tooth butting noise generated in the spline-coupling portion 50 is reduced.

Upon assembling of the drive system 12, the speed reduction shaft 26 is assembled in advance in an assembling line different from an assembling line of the drive system 12 (a main assembling line). In this assembling line of the speed reduction shaft 26, the elastic member 74 is interposed between the first rotary shaft 60 and the second rotary shaft 62. In the assembling line of the drive system 12, on the other hand, the second rotor shaft 28 is installed via the ball bearings 52 and 54 within the casing 19. Then, the speed reduction shaft 26 is spline-coupled to the second rotor shaft 28 installed within the casing 19. Since the speed reduction shaft 26 is assembled in advance in the assembling line different from the assembling line of the drive system 12, as described above, the elastic member 74 is not adversely affected by the spline-coupling of the speed reduction shaft 26 to the second rotor shaft 28, so that an installation load required for the spline-coupling is not increased, whereby application of an excessive load to the ball bearings 52 and 54 is prevented.

Upon assembling of the first rotary shaft 60 and the second rotary shaft 62 with respect to each other, the required installation load is increased in the presence of the elastic member 74. However, the application of the excessive load to the ball bearings 56, 58 is prevented because the speed reduction shaft 26 is assembled alone, namely, in the absence of the ball bearings 56, 58. Accordingly, it is not necessary to limit the installation load upon assembling of the speed reduction shaft 26, so that it is not necessary to limit the performance of the elastic member 74, whereby the performance of the elastic member 74 to reduce the tooth butting noise can be greatly improved. It is also noted that the space within which the elastic member 74 can be installed is enlarged, so that the freedom of adjustment in such as rigidity or the like, of the elastic member 74 is further increased.

In the present embodiment described above, the speed reduction shaft 26 is constituted by the first rotary shaft 60 and the second rotary shaft 62, and the elastic member 74 is interposed between the first rotary shaft 60 and the second rotary shaft 62 such that the first and second rotary shafts are operatively connected to each other through the elastic member 74, so that the tooth butting noise due to the torque variation transmitted from the engine 14 can be reduced by the elastic member 74. Further, the second rotor shaft 28 of the second electric motor MG2 and the speed reduction shaft 26 are assembled with respect to each other after the speed reduction shaft 26 is assembled in advance such that the elastic member 74 is interposed between the first rotary shaft 60 and the second rotary shaft 62. Namely, the elastic member 74 is installed upon assembling of the first rotary shaft 60 and the second rotary shaft 62 in advance, so that the load required for installation of the speed reduction shaft 26 while the second rotor shaft 28 is supported by the ball bearings 52 and 54 is not increased in the presence of the elastic member 74, making it possible to prevent an increase of the load to be applied to the ball bearings 52, 54 upon installation of the speed reduction shaft 26. In addition, it is not necessary to limit the performance of the elastic member 74 since the elastic member 74 is installed upon assembling of the first rotary shaft 60 and the second rotary shaft 62 with respect to each other, so that the function of the elastic member 74 to reduce the tooth butting noise can be greatly improved.

The present embodiment is further configured such that the elastic member 74 is disposed in the radial gap formed between the respective axial portions of the first rotary shaft 60 and the second rotary shaft 62 overlapping each other as seen in their radial direction, so that the tooth butting force to be generated upon mutual butting of the external spline teeth 70 of the first rotary shaft 60 and the internal spline teeth 64 of the second rotary shaft 62 against each other is reduced by the elastic member 74, whereby the tooth butting noise is reduced. Further, the elastic member 74 to be interposed between the first rotary shaft 60 and the second rotary shaft 62 is installed upon assembling of the first and second rotary shafts with respect to each other, so that it is possible to prevent application of an excessive load to the ball bearings 52, 54 upon assembling of the second rotor shaft 28 and the speed reduction shaft 26 with respect to each other.

Other embodiments of this invention will be described. In the following descriptions, the same reference signs will be used to identify substantially the same elements as provided in the preceding embodiment.

Second Embodiment

Figure 7:
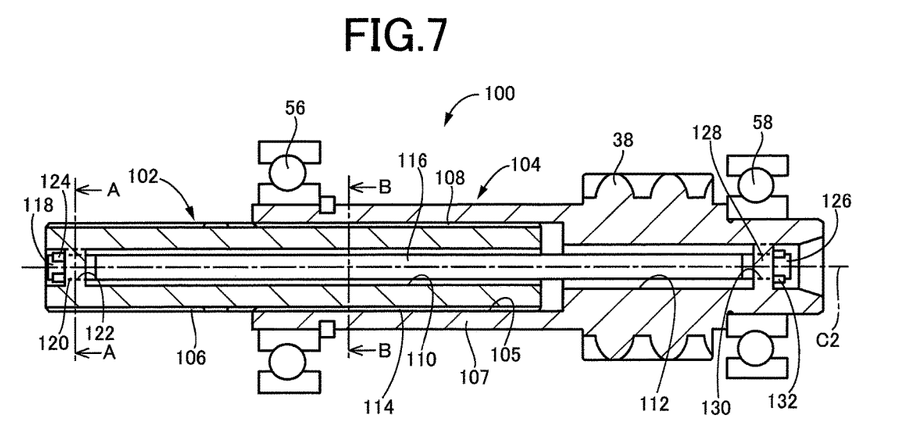
FIG. 7 is a cross sectional view showing a structure of a speed reduction shaft in another embodiment of this invention.
Figure 8:
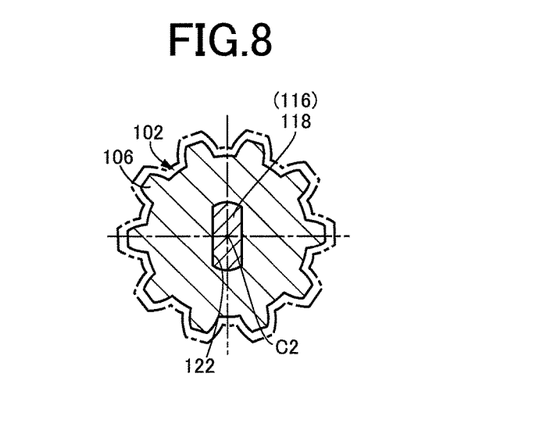
FIG. 8 is a cross sectional view taken along line A-A of FIG. 7.
Figure 9:
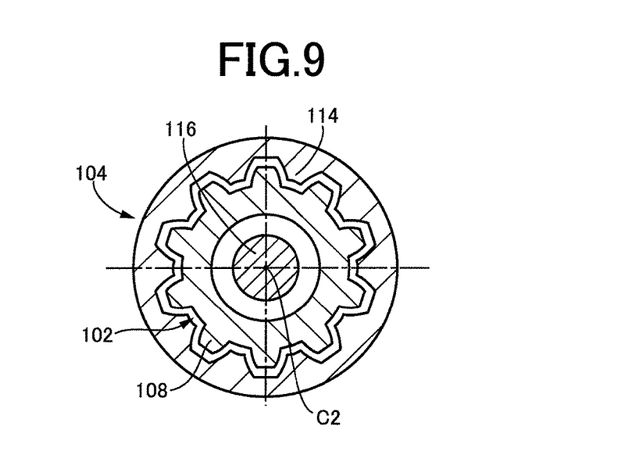
FIG. 9 is a cross sectional view taken along line B-B of FIG. 7.

FIG. 7 shows the structure of a speed reduction shaft 100 in another embodiment of this invention. FIG. 7 is the cross sectional view showing the overall arrangement of the speed reduction shaft 100. FIG. 8 is the cross sectional view taken along line A-A of FIG. 7, while FIG. 9 is the cross sectional view taken along line B-B of FIG. 7. As shown in FIG. 7, the speed reduction shaft 100 is constituted by a first rotary shaft 102 spline-coupled to the second rotor shaft 28 of the second electric motor MG2, and a second rotary shaft 104 having the speed reduction gear 38 formed thereon. The first rotary shaft 102 is fitted in an axial bore 105 formed in the second rotary shaft 104.

The first rotary shaft 102 has an external spline teeth 106 formed on an outer circumferential surface of its axial end portion remote from the ball bearing 58 (on the side of the second electric motor MG2), so that the first rotary shaft 102 is spline-coupled to the second rotor shaft 28 through the external spline teeth 106. The first rotary shaft 102 further has external spline teeth 108 formed on an outer circumferential surface of its axial portion on the side of the ball bearing 58, more particularly, on an outer circumferential surface of its axial portion overlapping the second rotary shaft 104 as seen in the radial direction when the first rotary shaft 102 is fitted in the second rotary shaft 104. Further, the first rotary shaft 102 has an axial bore 110 of a circular transverse cross sectional shape coaxial with the second axis C2. It is noted that the external spline teeth 106 and the external spline teeth 108 may have the same number of teeth and/or the same shape, or different numbers of teeth and/or different shapes.

The second rotary shaft 104 has a cylindrical portion 107, in the presence of the axial bore 105 formed in the axial portion of the second rotary shaft 104 on the side of the ball bearing 56. The second rotary shaft 104 has an axial bore 112 communicating with the axial bore 105, in its axial portion on the side of the ball bearing 58. The axial bore 112 is determined so that the axial bore 112 has substantially the same radial dimension as the axial bore 110. The cylindrical portion 107 of the second rotary shaft 104 has internal spline teeth 114 spline-coupled to the external spline teeth 108. Accordingly, the first rotary shaft 102 is fitted in the second rotary shaft 104 such that the first and second rotary shafts 102 and 104 are operatively spline-coupled to each other.

Within the axial bore 110 of the first rotary shaft 102 and the axial bore 112 of the second rotary shaft 104, there is disposed a torsion bar 116 of a circular transverse cross sectional shape extending through those axial bores 110 and 112. The torsion bar 116 is an elongate elastic member having the circular transverse cross sectional shape. The torsion bar 116 is disposed on the second axis C2, and is connected at its one axial end to the first rotary shaft 102, and at its other axial end to the second rotary shaft 104. It is noted according to the invention that the torsion bar 116 corresponds to an elongate member.

The torsion bar 116 is connected to the first rotary shaft 102 at its axial end (one axial end) on the side of the second electric motor MG2. The torsion bar 116 has a protrusion 118 of a substantially rectangular cross sectional shape formed at its above-indicated axial end (one axial end), as shown in FIG. 8. On the other hand, the first rotary shaft 102 has a wall portion 120 at its axial end on the side of the second electric motor MG2, which wall portion 120 is formed perpendicularly to the second axis C2. This wall portion 120 has a fitting hole 122 having the same cross sectional shape (substantially rectangular cross sectional shape) as the protrusion 118 of the torsion bar 116. The protrusion 118 is fitted in this fitting hole 122 such that the protrusion 118 is not rotatable relative to the fitting hole 122. A retainer ring 124 is fitted on the protrusion 118 of the torsion bar 116, to prevent an axial movement of the torsion bar 116.

The torsion bar 116 is connected to the second rotary shaft 104 at its axial end (the other axial end) on the side of the ball bearing 58. The torsion bar 116 has another protrusion 126 of a substantially rectangular cross sectional shape formed at its above-indicated other axial end (the other axial end). On the other hand, the second rotary shaft 104 has a wall portion 128 at its axial end on the side of the ball bearing 58, which wall portion 128 is formed perpendicularly to the second axis C2. This wall portion 128 has a fitting hole 130 having the same cross sectional shape (substantially rectangular cross sectional shape) as the protrusion 126 of the torsion bar 116. The protrusion 126 is fitted in this fitting hole 130 such that the protrusion 126 is not rotatable relative to the fitting hole 130. A retainer ring 132 is fitted on the protrusion 126 of the torsion bar 116, to prevent an axial movement of the torsion bar 116.

The rotational positions of the protrusions 118 and 126 of the torsion bar 116 and the fitting holes 122 and 130 when the torsion bar 116 is installed in position (when a torque is not transmitted to the torsion bar 116) are determined (namely, the rotational position of the torsion bar upon its installation is determined) such that the external spline teeth 108 of the first rotary shaft 102 and the internal spline teeth 114 of the second rotary shaft 104 are not in contact with each other. It is further noted that an amount of rotational backlash left between the protrusions 118, 126 and the corresponding fitting holes 122, 130 at the opposite axial ends of the torsion bar 116 after its installation is determined to be smaller than an amount of rotational backlash left between the external spline teeth 108 and the internal spline teeth 114. With the positional determinations described above, the torsion bar 116 is torsionally twisted prior to mutual butting of the external spline teeth 108 and the internal spline teeth 114 against each other, upon transmission of a torque to the speed reduction shaft 100.

When a torque variation of the engine 14 is transmitted through the counter shaft 30 to the speed reduction shaft 100 constructed as described above while the drive torque Nm of the second electric motor MG2 is zero, the first rotary shaft 102 and the second rotary shaft 104 are rotated relative to each other such that the torsion bar 116 is torsionally twisted prior to the mutual butting of the external spline teeth 108 and the internal spline teeth 114 against each other, so that a force of mutual butting of the external spline teeth 108 and the internal spline teeth 114 is reduced by the torsion bar 116. Accordingly, the tooth butting noise due to the torque variation transmitted from the engine 14 is reduced by the torsion bar 116 disposed within the speed reduction shaft 100. Further, the torque variation transmitted from the engine 14 is absorbed by the torsion bar 116, so that a torque variation transmitted to a spline-coupling portion between the second rotor shaft 28 and the speed reduction shaft 100 is reduced, whereby a tooth butting noise generated in this spline-coupling portion is reduced.

In addition, the speed reduction shaft 100 is assembled in advance in a sub-assembling line different from a main assembling line of the drive system 12. Accordingly, an installation load required for coupling the speed reduction shaft 100 to the second rotor shaft 28 upon assembling of the drive system 12 in the main assembling line is not increased, whereby application of an excessive load to the ball bearings is prevented.

The present embodiment described above has substantially the same advantages as the preceding embodiment. The present embodiment is further configured such that the first rotary shaft 102 and the second rotary shaft 104 are connected to each other through the torsion bar 116, so that the torsion bar 116 is torsionally twisted upon mutual butting of the external spline teeth 108 of the first rotary shaft 102 and the internal spline teeth 114 of the second rotary shaft 104 against each other, whereby the force of the mutual butting of the spline teeth of the first and second rotary shafts 102 and 104 against each other is reduced, and the tooth butting noise is reduced. Further, the torsion bar 116 is installed upon assembling of the first and second rotary shafts 102 and 104 with respect to each other, so that it is possible to prevent application of the excessive load to the ball bearings 52 and 54 upon coupling of the speed reduction shaft 100 to the second rotor shaft 28.

The present embodiment is also configured such that the rotational position of the torsion bar 116 and the first and second rotary shafts 102 and 104 relative to each other is determined such that the external spline teeth 108 of the first rotary shaft 102 and the internal spline teeth 114 of the second rotary shaft 104 are not in contact with each other while a torque is not transmitted to the rotary shafts, so that the torsion bar 116 is torsionally twisted with a high degree of stability prior to the mutual butting of the external spline teeth 108 of the first rotary shaft 102 and the internal spline teeth 114 of the second rotary shaft 104 against each other, when a torque is transmitted to the speed reduction shaft 100, whereby the butting force is reduced, and the tooth butting noise is reduced.

Third Embodiment

Figure 10:
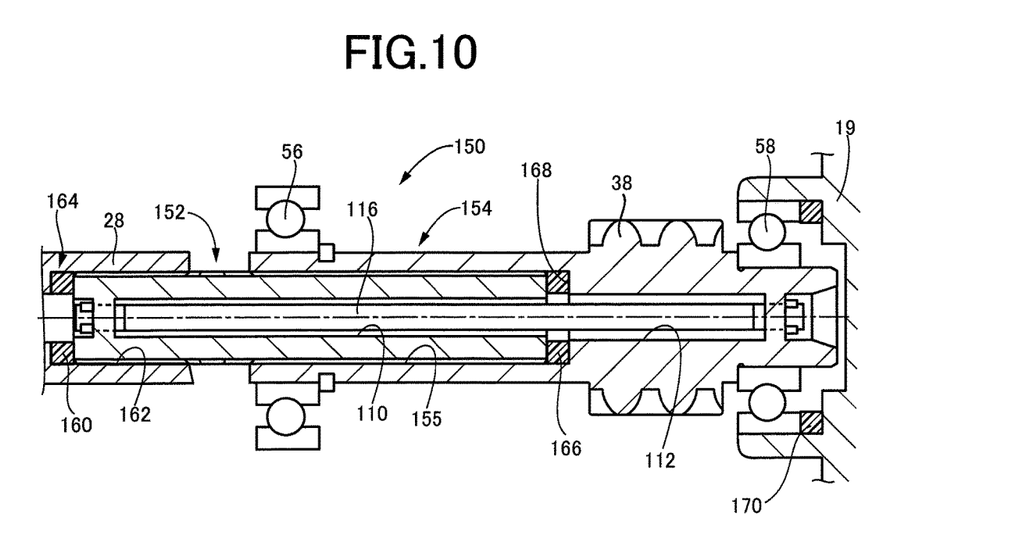
FIG. 10 is a cross sectional view showing a structure of a speed reduction shaft in a further embodiment of the invention.

FIG. 10 is the cross sectional view showing the overall arrangement of a speed reduction shaft 150 in a further embodiment of the invention.

As shown in FIG. 10, the speed reduction shaft 150 is constituted by a first rotary shaft 152 spline-coupled to the second rotor shaft 28 of the second electric motor MG2 and a second rotary shaft 154 having the speed reduction gear 38 formed thereon. The first rotary shaft 152 is fitted in an axial bore 155 formed in the second rotary shaft 154.

Unlike the speed reduction shaft 100 described above, the speed reduction shaft 150 in the present embodiment is provided with buffer members described below, respectively between the first rotary shaft 152 and the second rotor shaft 28, between the first rotary shaft 152 and the second rotary shaft 154, and between the ball bearing 58 supporting the speed reduction shaft 150 (second rotary shaft 154), and the casing 19. The speed reduction shaft 150 will be described with respect to its structure different from that of the speed reduction shaft 100.

A buffer member 160 formed of a rubber or resin material or in the form of a coned disc spring, for example, is interposed between the second rotor shaft 28, and the axial end portion of the first rotary shaft 152 spline-coupled to the second rotor shaft 28, in the axial direction (as seen in the radial direction). The second rotor shaft 28 has an axial bore 162 formed therein, and a shoulder portion 164 for stopping an axial movement of the first rotary shaft 152. The buffer member 160 is interposed between the shoulder portion 164 and the first rotary shaft 152, in the axial direction. The buffer member 160 functions to damp a shock of abutting contact of the second rotor shaft 28 and the first rotary shaft 152 with each other upon a movement of the second rotor shaft 28 and the first rotary shaft 152 relative to each other in the thrust direction (in the axial direction). In this respect, it is noted that the relative axial movement of the second rotor shaft 28 and the first rotary shaft 152 is caused by a force in the thrust direction (in the axial direction) acting on the speed reduction shaft 150 when a torque is transmitted to the speed reduction gear 38 which is a helical gear. It is noted according to the present invention that the second rotor shaft 28 corresponds to a member disposed axially adjacent to the first rotary shaft while the buffer member 160 corresponds to a second elastic member.

Further, a buffer member 166 formed of a rubber or resin material or in the form of a coned disc spring, for example, is interposed between the first rotary shaft 152 and the second rotary shaft 154, in the axial direction (as seen in the radial direction). The axial bore 155 formed through the second rotary shaft 154 has a stepped bottom surface 168 which is formed perpendicularly to the second axis C2, adjacent to the speed reduction gear 38 as seen in the radial direction, and at which the radial dimension of the axial bore 155 is reduced. The buffer member 166 is interposed between the axial end portion of the first rotary shaft 152 fitted in the axial bore 155 and the stepped bottom surface 168 of the second rotary shaft 154, in the axial direction (as seen in the radial direction). The buffer member 166 functions to damp a shock of abutting contact of the first rotary shaft 152 and the second rotary shaft 154 upon a movement of the first and second rotary shafts 152 and 154 relative to each other in the thrust direction (in the axial direction). It is noted according to the present invention that the buffer member 166 corresponds to a second elastic member, and that since the first and second rotary shafts 152 and 154 are disposed axially adjacent to each other, the first rotary shaft 152 corresponds to the member disposed axially adjacent to the second rotary shaft while the second rotary shaft 154 corresponds to the member disposed axially adjacent to the first rotary shaft.

Further, a buffer member 170 formed of a rubber or resin material or in the form of a coned disc spring, for example, is interposed between the ball bearing 58 and the casing 19 in the axial direction (as seen in the radial direction). The buffer member 170 is disposed in a radial space between an outer ring of the ball bearing 58 and the casing 19. When the second rotary shaft 154 is moved relative to the casing 19 in the thrust direction (in the axial direction), the outer ring of the ball bearing 58 is moved together with the second rotary shaft 154 in the thrust direction. However, the buffer member 170 functions to damp a shock of abutting contact of the outer ring of the ball bearing 58 and the casing 19 with each other. It is noted according to the present invention that the ball bearing 58 which is axially moved together with the second rotary shaft 154 corresponds to a member which is moved together with the second rotary shaft, and that the casing 19 corresponds to a member disposed adjacent to this member in the axial direction, while the buffer member 170 corresponds to a second elastic member.

The present embodiment wherein the speed reduction shaft 150 is basically identical in construction with that of the speed reduction shaft 100 in the preceding embodiment has substantially the same advantages as the preceding embodiment. In addition, the buffer members 160, 166 and 170 are disposed respectively between the first rotary shaft 152 and the second rotor shaft 28, between the first rotary shaft 152 and the second rotary shaft 154, and between the ball bearing 58 and the casing 19, so that an abutting contact between the first and second rotary shafts 152 and 154 upon their relative axial movement is damped.

Fourth Embodiment

Figure 11:
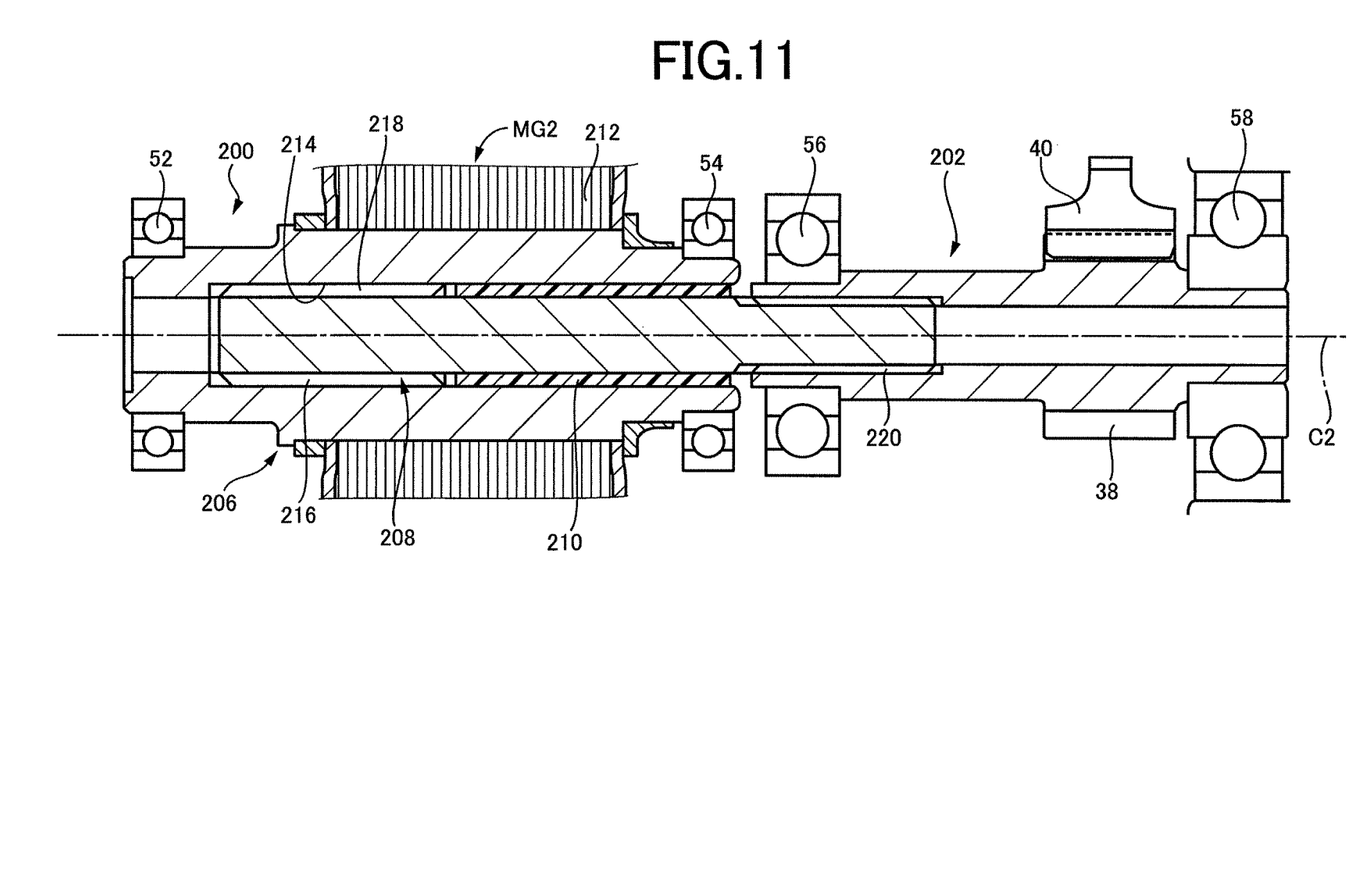
FIG. 11 is a cross sectional view showing structures of a second rotor shaft of a second electric motor and a speed reduction shaft in a still further embodiment of the invention.

FIG. 11 is the cross sectional view showing the structures of a second rotor shaft 200 of the second electric motor MG2 and a speed reduction shaft 202, in a still further embodiment of the invention. The second rotor shaft 200 and the speed reduction shaft 202 are disposed in series with each other, rotatably about the second axis C2, and are operatively spline-coupled to each other.

In the present embodiment, the second rotor shaft 200 is constituted by two members in the form of a first rotary shaft 206 and a second rotary shaft 208. Further, an elastic member 210 is interposed between the first rotary shaft 206 and the second rotary shaft 208. The arrangement of the second rotor shaft 200 will be primarily described.

The second rotor shaft 200 is constituted by the first rotary shaft 206 and the second rotary shaft 208 which are spline-coupled to each other so that the first and second rotary shafts 206 and 208 are rotated as a unit. The first rotary shaft 206 has a cylindrical shape, and is supported at its opposite axial ends by ball bearings 52 and 54, rotatably about the second axis C2. Further, a rotor 212 of the second electric motor MG2 is fixedly mounted on an outer circumferential surface of the first rotary shaft 206 such that the rotor 212 and the first rotary shaft 206 are rotated together.

The second rotary shaft 208 has a columnar shape, and is supported rotatably about the second axis C2. The second rotary shaft 208 is spline-coupled in its one axial end portion (on the side of the ball bearing 58) to the speed reduction shaft 202, while the other axial end portion (on the side of the ball bearing 52) is disposed within an axial bore 214 formed in the first rotary shaft 206.

The first rotary shaft 206 has internal spline teeth 216 formed in the inner circumferential surface of its axial portion on the side of the ball bearing 52, which inner circumferential surface defines the axial bore 214. On the other hand, the second rotary shaft 208 has external spline teeth 218 formed on the outer circumferential surface of its axial portion disposed within the first rotary shaft 206. Upon installation of the second rotary shaft 208 within the axial bore 214 of the first rotary shaft 206, the internal spline teeth 216 and the external spline teeth 218 are brought into spline-engagement with each other, so that the first rotary shaft 206 and the second rotary shaft 208 are operatively connected to each other. It is noted that the number of teeth and shape of the external spline teeth 218 are different from those of external spline teeth 220 which are also formed on the second rotary shaft 208, for spline-coupling with the speed reduction shaft 202.

A radial gap is formed between axial portions of the first rotary shaft 206 and the second rotary shaft 208 which overlap each other as seen in the radial direction and in which the internal spline teeth 216 and the external spline teeth 218 are not formed. The elastic member 210 is disposed in this radial gap. The elastic member 210 is dimensioned so that the elastic member 210 is pressed (compressed) with a suitable force by the first and second rotary shafts 206 and 208 which are assembled with respect to each other.

The elastic member 210 interposed between the first rotary shaft 206 and the second rotary shaft 208 as described above is also elastically deformed when a torque variation is transmitted from the engine 14 to the second rotor shaft 200 while the torque Nm of the second electric motor MG2 is zero. Accordingly, a force of mutual butting of the internal spline teeth 216 and the external spline teeth 218 is reduced, and the tooth butting noise is reduced. Thus, the elastic member 210 provided in the second rotor shaft 200 also makes it possible to reduce the tooth butting noise. Further, a portion of the torque variation transmitted from the engine 14 is absorbed by the elastic member 210. As a result, the torque variation transmitted to a spline-coupling portion between the second rotor shaft 200 and the speed reduction shaft 202 is reduced, and the tooth butting noise generated in this spline-coupling portion is reduced.

In addition, the second rotor shaft 200 is assembled in a sub-assembling line different from a main assembling line in which the drive system is assembled, for example. During assembling of the second rotor shaft 200, the elastic member 210 is installed within the second rotor shaft 200. During this assembling of the second rotor shaft 200, more specifically, upon insertion of the second rotary shaft 208 into the axial bore 214 of the first rotary shaft 206, the elastic member 210 generates a force of resistance to the insertion, so that a load required to be applied for the insertion is increased. However, an excessive load will not be applied to the ball bearings 52 and 54, since the second rotor shaft 200 is assembled while the ball bearings 52 and 54 are not mounted on the second rotor shaft 200.

The present embodiment wherein the elastic member 210 is disposed within the second rotor shaft 200 also permits reduction of the tooth butting noise due to the torque variation transmitted from the engine 14. Further, the second rotor shaft 200 is assembled in the sub-assembling line different from the main assembling line in which the speed reduction shaft 202 is coupled to the second rotor shaft 200, for example, so that the load required for coupling the speed reduction shaft 202 to the second rotor shaft 200 is not increased, whereby application of an excessive load to the ball bearings 52 and 54 is prevented.

Fifth Embodiment

Figure 12:
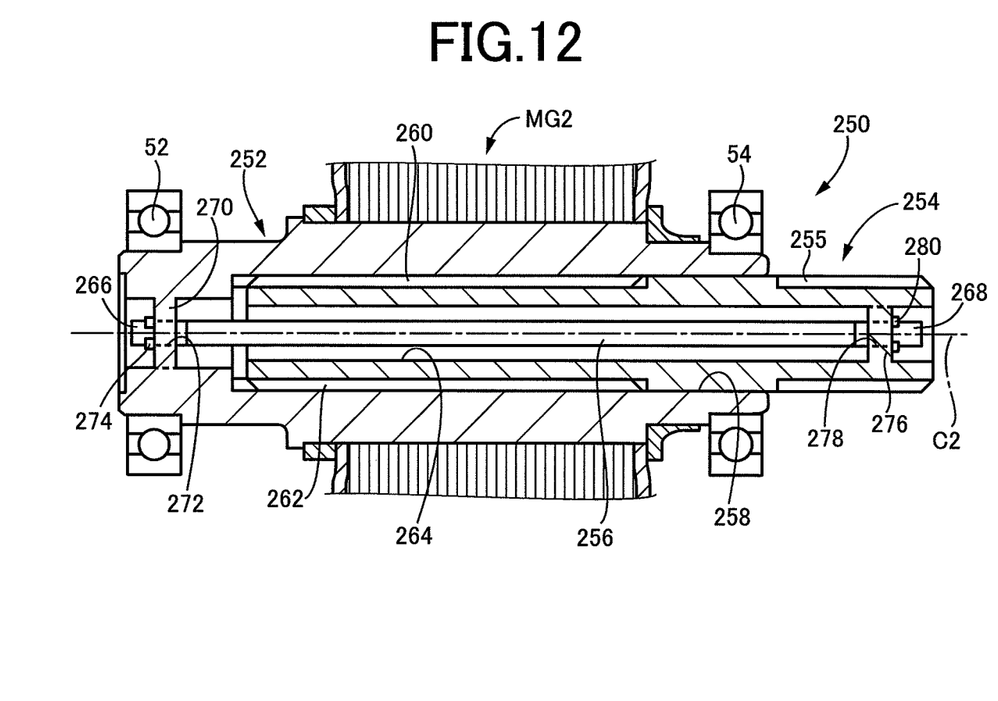
FIG. 12 is a view showing a structure of a second rotor shaft in a yet further embodiment of the present invention.

FIG. 12 shows the structure of a second rotor shaft 250 in a yet further embodiment of the invention. Like the second rotor shaft 200 in the preceding embodiment, the second rotor shaft 250 in the present embodiment is constituted by a first rotary shaft 252 and a second rotary shaft 254. Further, the first rotary shaft 252 and the second rotary shaft 254 are connected to each other by an elastic member in the form of an elongate torsion bar 256. The arrangement of the second rotor shaft 250 will be primarily described.

Each of the first rotary shaft 252 and the second rotary shaft 254 is disposed rotatably about the second axis C2, such that the second rotary shaft 254 is disposed within an axial bore 258 formed in the first rotary shaft 252.

The first rotary shaft 252 has internal spline teeth 260 formed in the inner circumferential surface defining the axial bore 258. On the other hand, the second rotary shaft 254 has external spline teeth 262 formed on the outer circumferential surface of its axial portion on the side of the ball bearing 52. Upon installation of the second rotary shaft 254 within the first rotary shaft 252, the internal spline teeth 260 and the external spline teeth 262 are brought into spline-engagement with each other, so that the first rotary shaft 252 and the second rotary shaft 254 are operatively connected to each other. It is noted that the number of teeth and shape of the external spline teeth 262 are different from those of external spline teeth 255 which are also formed on the second rotary shaft 254, for spline-coupling with the speed reduction shaft.

The torsion bar 256 is disposed within an axial bore 264 formed in the second rotary shaft 254 and the axial bore 258 formed in the first rotary shaft 252, and is connected at its one axial end (on the side of the ball bearing 52) to the first rotary shaft 252, and at its other axial end (on the side of the ball bearing 54) to the second rotary shaft 254.

The torsion bar 256 has a protrusion 266 and a protrusion 268 of a substantially rectangular cross sectional shape formed at its opposite axial end portions. On the other hand, the first rotary shaft 252 has a wall portion 270 formed near its axial end on the side of the ball bearing 52, which wall portion 270 is formed perpendicularly to the second axis C2, so as to close the axial bore 258. This wall portion 270 has a fitting hole 272 having the same cross sectional shape (substantially rectangular cross sectional shape) as the protrusion 266. The protrusion 266 is fitted in this fitting hole 272 such that the protrusion 266 is not rotatable relative to the fitting hole 272. A retainer ring 274 is fitted on the protrusion 266, to prevent an axial movement of the torsion bar 256.

The second rotary shaft 254 has a wall portion 276 formed near its axial end on the side of the ball bearing 54, which wall portion 276 is formed perpendicularly to the second axis C2, so as to close the axial bore 264. This wall portion 276 has a fitting hole 278 having the same cross sectional shape (substantially rectangular cross sectional shape) as the protrusion 268. The protrusion 268 is fitted in this fitting hole 278 such that the protrusion 268 is not rotatable relative to the fitting hole 278. A retainer ring 280 is fitted on the protrusion 268, to prevent an axial movement of the torsion bar 256.

The rotational positions of the protrusions 266 and 268 and the fitting holes 272 and 278 when the torsion bar 256 is installed in position while a torque is not applied to the second rotor shaft 250 are determined such that the internal spline teeth 260 of the first rotary shaft 252 and the external spline teeth 262 of the second rotary shaft 254 are not in contact with each other. It is further noted that an amount of each rotational backlash left between the protrusions 266, 268 and the corresponding fitting holes 272, 278 at the opposite axial ends of the torsion bar 256 after its installation is determined to be smaller than an amount of rotational backlash left between the internal spline teeth 260 and the external spline teeth 262. With the positional determinations described above, the torsion bar 256 is torsionally twisted prior to mutual butting of the internal spline teeth 260 and the external spline teeth 262 against each other, upon transmission of a torque to the second rotary shaft 254.

In the second rotor shaft 250 constructed as described above, the torsion bar 256 is torsionally twisted prior to mutual butting of the internal spline teeth 260 and the external spline teeth 262 against each other, when a torque variation of the engine 14 is transmitted to the second rotor shaft 250 while the drive torque Nm of the second electric motor MG2 is zero. Accordingly, the mutual butting of the internal spline teeth 260 and the external spline teeth 262 is reduced by the torsion bar 256, and the tooth butting noise is reduced. In addition, the second rotor shaft 250 is assembled in a sub-assembling line different from a main assembling line of the drive system 12, so that an installation load required for coupling the speed reduction shaft to the second rotor shaft 250 upon assembling of the drive system 12 in the main assembling line is not increased, whereby application of an excessive load to the ball bearings is prevented. Further, a portion of the torque variation transmitted from the engine 14 is absorbed by the torsion bar 256, so that a torque variation transmitted to a spline-coupling portion between the second rotor shaft 250 and the speed reduction shaft 202 is reduced, whereby a tooth butting noise generated in this spline-coupling portion is reduced.

The present embodiment wherein the second rotor shaft 250 is constituted by the first rotary shaft 252 and the second rotary shaft 254, and the torsion bar 256 is interposed between the first and second rotary shafts 252 and 254 also permits reduction of the tooth butting noise due to the torque variation of the engine 14. Further, since the torsion bar 256 is disposed within the second rotor shaft 250, the load required for assembling the second rotor shaft 250 and the speed reduction shaft with respect to each other in the main assembling line is not increased, so that application of an excessive load to the ball bearings is prevented.

While the preferred embodiments of this invention have been described in detail by reference to the drawings, for illustrative purpose only, it is to be understood that the invention may be otherwise embodied.

For example, a buffer member may be interposed between the first or second rotary shaft 252, 254 of the second rotor shaft 250, and a member which is axially adjacent to the rotary shaft 252, 254.

In the above-described embodiments, the protrusions 118, 126, 266, 268 for connection of the torsion bar 116, 256 have the substantially rectangular cross sectional shape, and the fitting holes 122, 130, 272, 278 in which the protrusions 118, 126, 266, 268 are fitted have similar substantially rectangular cross sectional shape. However, the cross sectional shapes of the protrusions and fitting holes are not limited to the substantially rectangular shapes. For instance, the protrusions and fitting holes may have a triangular or pentagonal cross sectional shape. The cross sectional shapes of the protrusions and fitting holes are not limited, provided the protrusions and fitting holes permit connection of the torsion bar to the first and second rotary shafts such that the torsion bar is rotated together with the first and second rotary shafts.

In the illustrated embodiments, the speed reduction shaft 26, 100, 150, 202 is coupled to the second rotor shaft 28, 200, 250 while the second rotor shaft is supported by the ball bearings 52 and 54. However, the second rotor shaft may be coupled to the speed reduction shaft while the speed reduction shaft is supported by the ball bearings 56 and 58.

In the drive system 12 according to the illustrated embodiments, the engine 14 is disposed on the first axis C1, and the second rotor shaft 28, 200, 250 of the second electric motor MG2 and the speed reduction shaft 26, 100, 150, 202 are disposed on the second axis C2, while the counter shaft 30 is disposed on the third axis C3. However, the drive system 12 is not limited to this arrangement. Namely, the drive system may be suitably modified, provided the drive system has a rotor shaft of an electric motor, a drive shaft spline-coupled to this rotor shaft, and a power transmitting shaft operatively connected to the drive shaft, and an engine is operatively connected to the power transmitting shaft.

In the illustrated embodiment, the buffer member 160 is interposed between the first rotary shaft 152 and the second rotor shaft 28, and the buffer member 166 is interposed between the first rotary shaft 152 and the second rotary shaft 154, while the buffer member 170 is interposed between the casing 19 and the ball bearing 58 which is axially moved with the second rotary shaft 154. However, the provision of the three buffer members is not necessarily required, and at least one of those three buffer members may be provided. Further, the buffer members may be disposed at any other suitable positions.

In the illustrated embodiments, the ball bearing 58 is axially moved together with the second rotary shaft 154, and the buffer member 170 is interposed as the second elastic member between the ball bearing 58 and the casing 19. However, a buffer member may be interposed between a member (such as ball bearing) axially moved together with the first rotary shaft, and another member which is axially adjacent to the former member.

While the embodiments of the invention have been described for illustrative purpose, it is to be understood that the invention may be embodied with various changes and improvements which may occur to those skilled in the art.

NOMENCLATURE OF REFERENCE SIGNS

10: Hybrid vehicle (Vehicle)
14: Engine
26, 100, 150, 202: Speed reduction shaft (Drive shaft)
28, 200, 250: Second rotor shaft (Rotor shaft of electric motor)
30: Counter shaft (Power transmitting shaft)
52, 54, 56, 58: Ball bearing (Bearing)
60, 102, 152, 206, 252: First rotary shaft
62, 104, 154, 208, 254: Second rotary shaft
74, 210: Elastic member
110: Axial bore
112: Axial bore
116, 256: Torsion bar (Elongate member)
160, 166, 170: Buffer member (Second elastic member)
MG2: Second electric motor (Electric motor)

The invention claimed is:

1. A support structure for rotating shafts of a vehicle, comprising: a drive shaft operatively connected to a power transmitting shaft to which a drive force of an engine is transmitted; and a rotor shaft of an electric motor spline-coupled to said drive shaft, each of said rotor shaft of the electric motor and said drive shaft being supported by at least one bearing, one of said rotor shaft and said drive shaft being constituted by a first rotary shaft and a second rotary shaft which are operatively spline-connected to each other, and an elastic member being interposed between said first rotary shaft and said second rotary shaft such that said first and second rotary shafts are operatively connected to each other through said elastic member.

2. The support structure according to claim 1, wherein said drive shaft is constituted by said first rotary shaft and said second rotary shaft,
said first rotary shaft is spline-coupled to said rotor shaft, and
said second rotary shaft is operatively connected to said power transmitting shaft.

3. The support structure according to claim 1, wherein said rotor shaft is constituted by said first rotary shaft and said second rotary shaft, and
said second rotary shaft is spline-coupled to said drive shaft.

4. The support structure according to claim 1, wherein said first rotary shaft and said second rotary shaft have axial portions which overlap each other as seen in their radial direction after assembling of the first and second rotary shafts with respect to each other, and
the axial portions include: first axial parts in which the first and second rotary shafts are spline-coupled to each other; and second axial parts in which said elastic member is disposed in a radial gap formed between the second axial parts.

5. The support structure according to claim 1, wherein said elastic member is an elongate member which is disposed within said first rotary shaft having an axial bore and said second rotary shaft having an axial bore, and
said elongate member is connected at its one axial end to said first rotary shaft, and at its other axial end to said second rotary shaft.

6. The support structure according to claim 5, wherein said drive shaft and said power transmitting shaft are operatively connected to each other through a helical gear, and
a second elastic member is interposed at least one of the following positions: between said first rotary shaft and a member disposed axially adjacent to said first rotary shaft; between said second rotary shaft and a member disposed axially adjacent to said second rotary shaft; and between a member to be moved together with said first rotary shaft or said second rotary shaft, and a member axially adjacent to this member.

7. The support structure according to claim 5, wherein a rotational position of said elongate member is determined such that spline teeth of said first rotary shaft and spline teeth of said second rotary shaft are not in contact with each other when a torque is not transmitted to said elongate member.

* * * * *